US012756711B2

(12) United States Patent
Jogand-Coulomb et al.

(10) Patent No.: US 12,756,711 B2
(45) Date of Patent: Oct. 6, 2026

(54) TECHNIQUES FOR PROVIDING CREDENTIALS AND OTHER INFORMATION

(71) Applicant: Toppan Security SAS, Paris (FR)

(72) Inventors: Fabrice Jogand-Coulomb, Aix en Provence (FR); Adrian Meads, Basingstoke (GB)

(73) Assignee: Toppan Security SAS, Paris (FR)

( * ) Notice: Subject to any disclaimer, the term of this patent is extended or adjusted under 35 U.S.C. 154(b) by 52 days.

(21) Appl. No.: 18/868,985

(22) PCT Filed: Jun. 13, 2022

(86) PCT No.: PCT/IB2022/000509

§ 371 (c)(1),
(2) Date: Nov. 25, 2024

(87) PCT Pub. No.: WO2023/242610

PCT Pub. Date: Dec. 21, 2023

(65) Prior Publication Data

US 2026/0230475 A1 Aug. 6, 2026

(51) Int. Cl.
*H04L 9/40* (2022.01)

(52) U.S. Cl.
CPC .......... *H04L 63/10* (2013.01); *H04L 63/0428* (2013.01); *H04L 63/083* (2013.01)

(58) Field of Classification Search
CPC .......................................................... H04L 63/10
See application file for complete search history.

(56) References Cited

U.S. PATENT DOCUMENTS

2015/0089620 A1* 3/2015 Manza .................... H04L 63/10 726/8
2016/0380774 A1* 12/2016 Lovelock .............. H04L 9/3247 713/169
2018/0197263 A1 7/2018 Pearson et al.
2019/0332683 A1* 10/2019 Thummala ............ H04L 63/102
(Continued)

FOREIGN PATENT DOCUMENTS

WO 2023242610 12/2023

OTHER PUBLICATIONS

"International Application Serial No. PCT IB2022 000509, International Search Report mailed Jan. 13, 2023", 4 pgs.
(Continued)

*Primary Examiner* — Bradley W Holder
(74) *Attorney, Agent, or Firm* — Schwegman Lundberg & Woessner, P.A.

(57) ABSTRACT

Techniques for providing more control to an issuer, e.g., governmental entity, and more particularly their backend team, which may provide citizens with a personalized virtualized experience. This may be achieved by the issuer provisioning adequate data, which is made available to a mobile App and/or verification devices. By using various techniques, the issuer may deliver such information using the same approach as for document data and even along with document data. The information may be packaged in a way that is no different from provisioning a document. In addition, because the document data is digitally signed by the issuer, it ensures authentic information for the user interface.

24 Claims, 6 Drawing Sheets

(56) References Cited

U.S. PATENT DOCUMENTS

| | | | | |
|---|---|---|---|---|
| 2022/0011999 | A1* | 1/2022 | Lovelock | G06F 3/147 |
| 2022/0051221 | A1 | 2/2022 | Pandey et al. | |

OTHER PUBLICATIONS

"International Application Serial No. PCT IB2022 000509, Written Opinion mailed Jan. 13, 2023", 6 pgs.

"Personal identification ISO compliant driving license Part 5 Mobile driving license mDL application", ISO IEC 18013-5:2021, IEC, 3, Rue De Varembe, Po Box 131, Ch-1211 Geneva 20, Switzerland, [Online]. Retrieved from the Internet:URL: URL:https: api.iec.ch harmonized publications download 1127798, (Sep. 30, 2021), 160 pages.

"XSLT Example", [Online]. Retrieved from the Internet:URL: https: web.archive.org web 20201030231854 https: www.quackit.com xml tutorial xslt_example.cfm, (Oct. 30, 2020), 3 pages.

"Xslt how to embed xsl into xml file Stack Overflow", [Online]. Retrieved from the Internet:URL: https: web.archive.org web 20211010220953 https: stackoverflow.com questions 32533660 how-to-embed-xsl-into-xml-file, (Oct. 10, 2021), 4 pages.

"International Application Serial No. PCT IB2022 000509, International Preliminary Report on Patentability mailed Dec. 26, 2024", 8 pages.

"European Application Serial No. 22790015.6, Response Filed May 19, 2025 to Communication pursuant to Rules 161(1) and 162 EPC mailed Nov. 22, 2024", 17 pages.

* cited by examiner

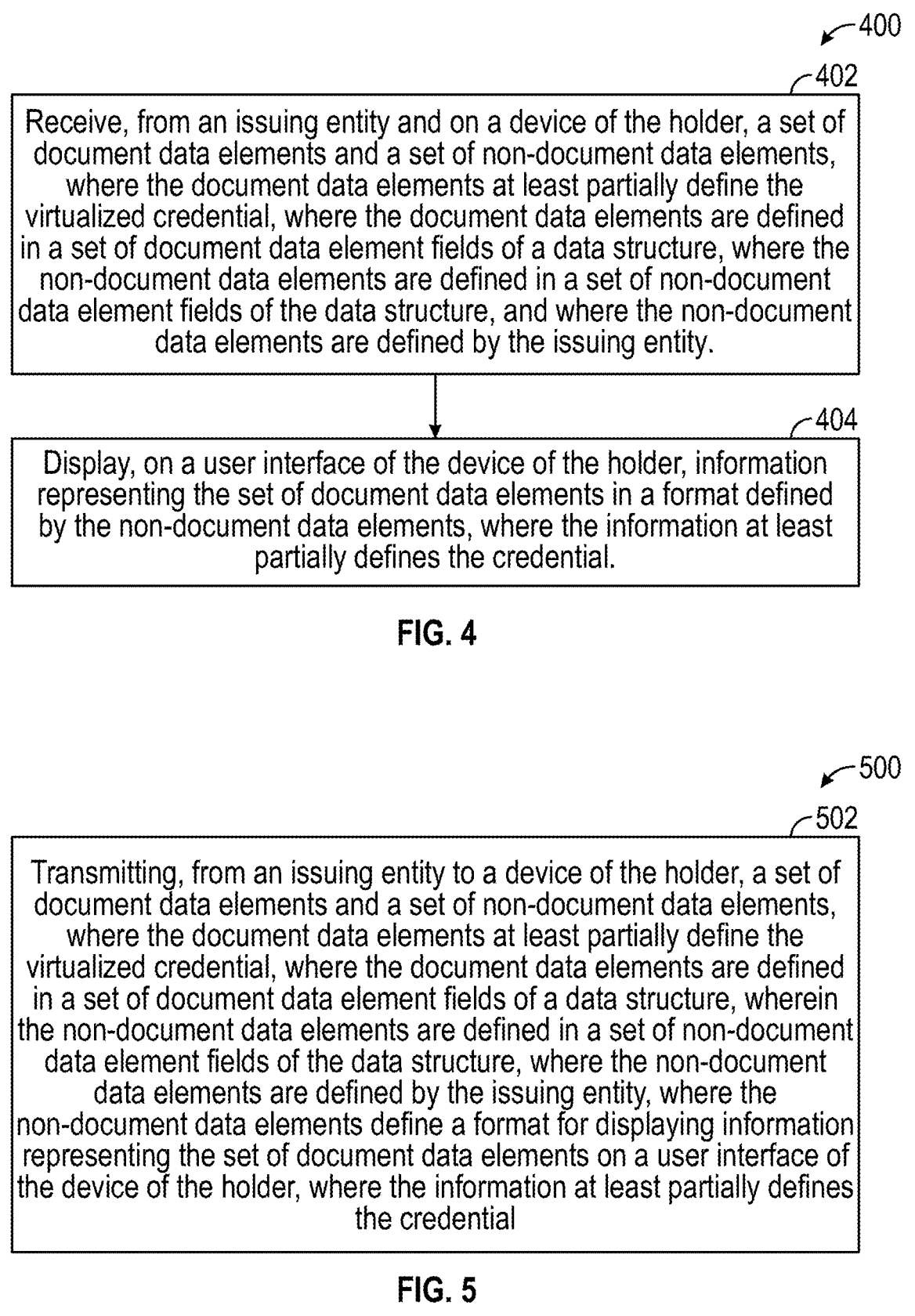

400

402

Receive, from an issuing entity and on a device of the holder, a set of document data elements and a set of non-document data elements, where the document data elements at least partially define the virtualized credential, where the document data elements are defined in a set of document data element fields of a data structure, where the non-document data elements are defined in a set of non-document data element fields of the data structure, and where the non-document data elements are defined by the issuing entity.

404

Display, on a user interface of the device of the holder, information representing the set of document data elements in a format defined by the non-document data elements, where the information at least partially defines the credential.

FIG. 4

500

502

Transmitting, from an issuing entity to a device of the holder, a set of document data elements and a set of non-document data elements, where the document data elements at least partially define the virtualized credential, where the document data elements are defined in a set of document data element fields of a data structure, wherein the non-document data elements are defined in a set of non-document data element fields of the data structure, where the non-document data elements are defined by the issuing entity, where the non-document data elements define a format for displaying information representing the set of document data elements on a user interface of the device of the holder, where the information at least partially defines the credential

FIG. 5

TECHNIQUES FOR PROVIDING CREDENTIALS AND OTHER INFORMATION

CROSS-REFERENCE TO RELATED APPLICATION

This application is a national stage application under 35 U.S.C. § 371 of PCT Appl. No. PCT/IB2022/000509, filed Jun. 13, 2022, which is incorporated herein by reference in its entirety.

FIELD OF THE DISCLOSURE

This document pertains generally, but not by way of limitation, to techniques for providing virtualized credentials.

BACKGROUND

Governments (or other "issuing entities") are increasingly interested in issuing virtualized ID cards to citizens. The virtualized ID cards may be provided on mobile phones, or other similar personal computing device, and displayed using an application (or "app") running on the device.

In some approaches, the app vendor decides on what information is used to present a document. For example, data from the document itself may be used. The issuing entity is not able to specify what information to use or not to use to present the document. In some such approaches, the app needs to know the document type in order to know which data element corresponds to which attribute. In addition, an app with a software development kit (SDK) may need to know which workflow is applicable to which document.

With some approaches, the focus for electronic wallet apps is on documents and bookmarks are typically left to the browser on the mobile device.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 4 is a flow diagram of an example of a computer-implemented method 400 of providing a virtualized credential of a holder.

FIG. 5 is a flow diagram of an example of a computer-implemented method 500 of providing a virtualized credential of a holder.

SUMMARY OF THE DISCLOSURE

Figure 1:
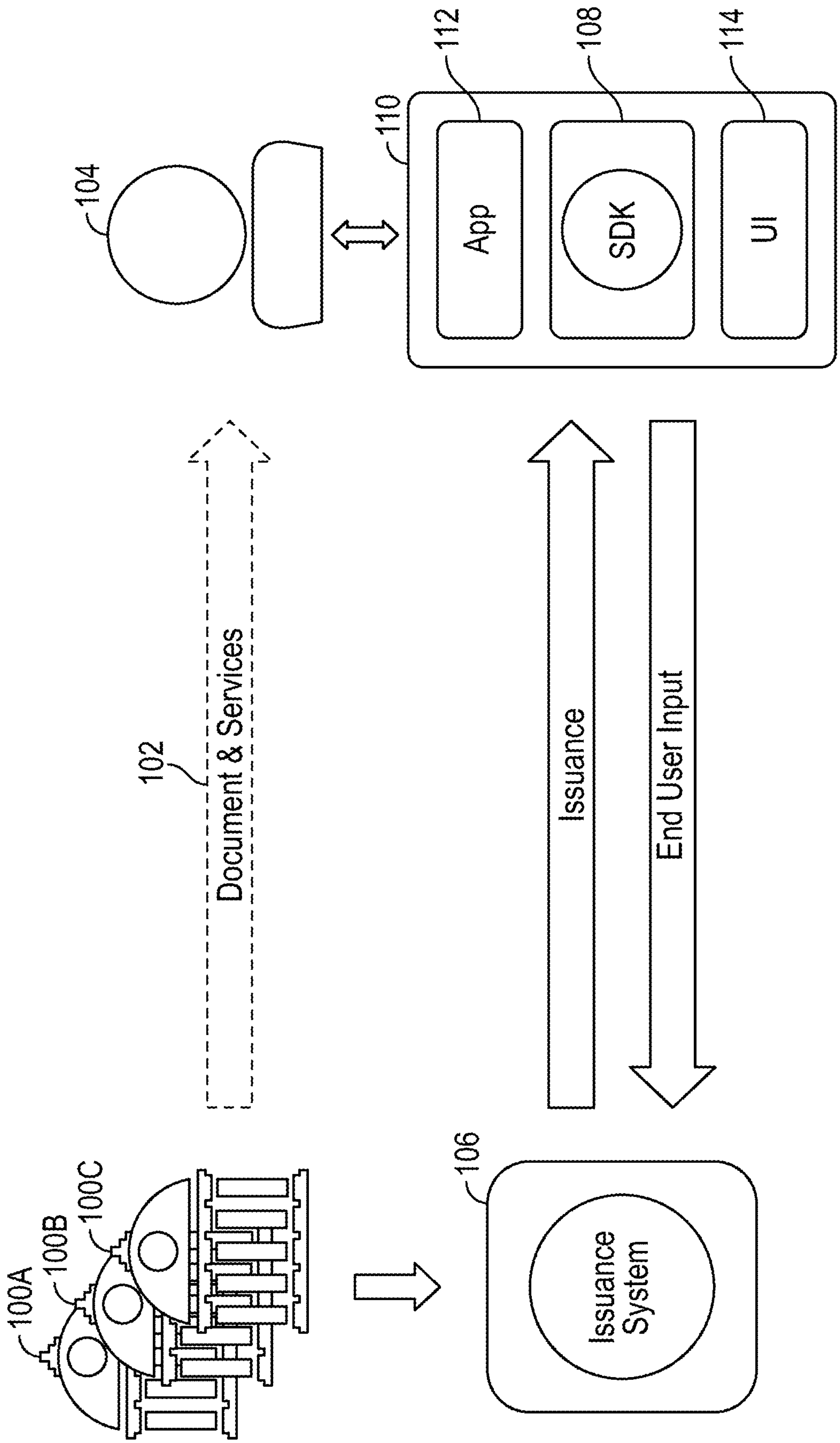
FIG. 1 is a conceptual diagram illustrating a flow of data between an issuer and a user.

This disclosure describes techniques for providing more control to an issuer, e.g., governmental entity, and more particularly their backend team, which may provide citizens with a personalized virtualized experience. This may be achieved by the issuer provisioning adequate data, which is made available to a mobile App and/or verification devices. By using various techniques, the issuer may deliver such information using the same approach as for document data and even along with document data. The information may be packaged in a way that is no different from provisioning a document. In addition, because the document data is digitally signed by the issuer, it ensures authentic information for the user interface In some aspects, this disclosure is directed to a method of providing a virtualized credential of a holder, comprising: receiving, from an issuing entity and on a device of the holder, a set of document data elements and a set of non-document data elements, wherein the document data elements at least partially define the virtualized credential, wherein the document data elements are defined in a set of document data element fields of a data structure, wherein the non-document data elements are defined in a set of non-document data element fields of the data structure, and wherein the non-document data elements are defined by the issuing entity; and displaying, on a user interface of the device of the holder, information representing the set of document data elements in a format defined by the non-document data elements, wherein the information at least partially defines the credential.

In some aspects, this disclosure is directed to at least one machine-readable medium including instructions for providing a virtualized credential of a holder, that, when executed by a machine, cause the machine to perform operations to: receive, from an issuing entity and on a device of the holder, a set of document data elements and a set of non-document data elements, wherein the document data elements at least partially define the virtualized credential, wherein the document data elements are defined in a set of document data element fields of a data structure, wherein the non-document data elements are defined in a set of non-document data element fields of the data structure, and wherein the non-document data elements are defined by the issuing entity; and display, on a user interface of the device of the holder, information representing the set of document data elements in a format defined by the non-document data elements, wherein the information at least partially defines the credential.

In some aspects, this disclosure is directed to at least one machine-readable medium including instructions for providing a virtualized credential of a holder, that, when executed by a machine, cause the machine to perform operations to: transmitting, from an issuing entity to a device of the holder, a set of document data elements and a set of non-document data elements, wherein the document data elements at least partially define the virtualized credential, wherein the document data elements are defined in a set of document data element fields of a data structure, wherein the non-document data elements are defined in a set of non-document data element fields of the data structure, wherein the non-document data elements are defined by the issuing entity, wherein the non-document data elements define a format for displaying information representing the set of document data elements on a user interface of the device of the holder, wherein the information at least partially defines the credential.

In some aspects, this disclosure is directed to at least one machine-readable medium including instructions for providing a virtualized credential of a holder, that, when executed by a machine, cause the machine to perform operations to: receive, from an issuing entity and on a device of the holder, a set of non-document data elements, wherein the non-document data elements are defined in a set of non-document data element fields of a data structure, wherein the non-document data elements are defined by the issuing entity, wherein document data elements at least partially define the virtualized credential, and wherein the document data elements are defined in a set of document data element fields of the data structure; and display, on a user interface of the device of the holder, information representing the set of non-document data elements in a format defined by the non-document data elements.

DETAILED DESCRIPTION

Governmental entities (or other "issuers") are increasingly interested in issuing virtualized (or digital) documents (or credentials) to citizens. For example, a governmental entity may issue to a citizen one or more virtualized credentials, such as an identification (ID) card, a vehicle registration, various certificates (such as birth certificates and marriage certificates), various permits and licenses (such as gun licenses or fishing permits), and a voting card. Issuing virtualized credentials may have several benefits, including enhanced privacy, easier access, and mobile convenience. For example, the virtualized credentials, such as a driver's license, may be provided on a mobile phone, or other similar personal computing device, and displayed using an application (or "App") running on the device.

The present inventors have recognized the desirability of providing more control to the issuer, e.g., governmental entity, and more particularly their backend team, which may provide citizens with a personalized virtualized experience. This may be achieved by the issuer provisioning adequate data, which is made available to the mobile App and/or verification devices. By using various techniques of this disclosure, the issuer may deliver such information using the same approach as for document data and even along with document data. The information may be packaged in a way that is no different from provisioning a document. In addition, because the document data is digitally signed by the issuer, it ensures authentic information for the user interface (UI).

The techniques of this disclosure may provide a number of benefits. For example, The issuer may control how the object is presented in the App, e.g., the text, icon and picture that may be used, and which is not dependent on the content of a document, such as the virtualized credential, e.g., driver's license. The International Organization for Standardization (ISO) standard ISO/IEC 18013-5 mDL mandates that a Latin alphabet be used for document data. However, by using techniques of this disclosure, the UI information may be separated from the document data present, and they may be provisioned at the same time.

As another example, the issuer may control the behavior of the App by indicating what actions are available to the user for a provisioned item, group of items or for the App itself, such as connecting to an issuer website, enrolling for a new document, requesting a modification to the data, deleting an item that may be associated with a document, presenting document data, etc. This may be desirable because the issuer knows what the item is about, e.g., the document type or if it is a service, and knows what is applicable to do.

As another example, the issuer may control what actions are available for a group of items. This may allow the issuer to control where that action should be presented (e.g., an issuer tab in the App). The action may be performed on multiple items at the same time or be unrelated to the items.

As another example, the issuer may deliver additional information valuable for a verification such as a web address, e.g., URL, to get an up-to-date status for that particular document. This may add information in non-document data that is not directed to the UI but instead for a verification device.

With the techniques of this disclosure, the App does not need to understand the type of document in order to present it. This may be quite valuable because each document is a set of data elements whose identifiers are specific. In addition, the App does not need to understand what any of the configured action that object specifies are about as long as the App facilitates the presentation of the information and supports the different steps of the workflow associated with the action. In short, the purpose is set by the issuer and presentation of it by the App in the UI may be sufficient for the end user to know what to do without the App needing to know anything more about it. In some examples, the mobile App where this gets provisioned to can be a browser App with extensions to support these specific features.

FIG. 1 is a conceptual diagram illustrating a flow of data between an issuer and a user.

A government has various issuing entities or issuers 100A-100C for different kinds of credentials or documents. For example, a first issuing entity 100A may issue drivers licenses, a second issuing entity 100B may issue birth certificates, and a third issuing entity 100C may issue fishing licenses. Each issuing entity may have documents and/or services 102 to offer to a user, such as a credential holder or holder 104, e.g., a citizen. The issuing entities 100A-100C may provide a set of document data elements and a set of non-document data elements to an issuance system 106, e.g., a backend of the issuing entity. The issuance system 106 may be similar to the machine 700 in FIG. 7. The issuance system 106 may mobilize any documents and prepare the data to issue the virtualized credentials to the holder 104.

The document data elements at least partially define a virtualized credential, e.g., a driver's license of the holder. The document data elements may be defined in a set of document data element fields of a data structure (or "container"). In some examples, the data structure may be defined by an international standard, such as the ISO/IEC 18013-5 standard ("Personal identification ISO—compliant driving license—Part 5: Mobile driving license (mDL) application"), and ISO/IEC AWI TS 23220-4 ("Cards and security devices for personal identification—Building blocks for identity management via mobile devices Part 4: Protocols and services for operational phase"), the entire contents of each being incorporated herein by reference.

The non-document data elements may be defined in a set of non-document data element fields of the data structure. The non-document data elements may be defined by the issuing entity. In some examples, the document data elements may include virtualized credential attributes, and the non-document data elements may be used to present the virtualize credential and present actions available to perform. As an example, a non-document data element, such as an icon associated with the virtualized credential or an image of the holder associated with the virtualized credential, may be defined or provisioned by the issuing entity.

In some examples, only some of the information is provisioned by the issuing entity.

For example, a virtualized credential (or document) may be provisioned without an associated action, or an action, such as displaying a link to a website, may be provisioned without an associated document. In some examples, the document data elements and the non-document data elements may be defined under different namespaces of the data structure.

The issuance system 106 may issue the set of document data elements and the set of non-document data elements to a software development kit (SDK) 108. In some examples, the SDK 108 may be installed on the holder's mobile device 110, e.g., mobile phone. The SDK 108 may include instructions to execute various workflows specified by the issuing entity. The SDK 108 may handle various specificities of the documents, e.g., digital travel credentials (DTC) versus mobile document (mdoc). The SDK 108 may interact with an application or App 112 installed on the mobile device 112. The SDK 108 may enforce what the issuing entity made available to the Application or App 112, e.g., a presentation layer, in order to present the item independently of what that item is. It should be noted that the SDK is not a necessary component. However, the SDK may be desirable to include because it may bring additional benefits to the App, such as getting a new version and benefitting from new features without changing the App and its UI.

The App 112 may receive, via a UI 114, user input from the holder 104 and may act as an intermediary between the issuing entity and the holder 104. The App 112 may display information representing the set of document data elements in a format defined by the non-document data elements, where the information at least partially defines the credential. The App 112 may follow the lead from the SDK 108 to support the workflow for the action to perform, such as to display a code, e.g., QR code, on the UI 114. The holder 104 may decide which workflow to select based on information provisioned by the issuing entity.

By using the techniques of this disclosure and having the benefit of an SDK that handles the specifics of doc type and workflows, App 112 does not need to be changed to handle new actions, services, documents, etc. Rather, an issuing entity may update the SDK 108, for example, with any changes. When a holder selects an action, service, document, etc. using the user interface, the App 112 may call the SDK 108, which will execute the appropriate workflows for handling. The SDK 108 may communicate with the issuance system 106.

The techniques of this disclosure may allow an issuing entity to provision more than just documents to the App 112, such as actions and services. For example, an issuing entity pay provide a link to a website or to backend software that is ported into the App 112 when the holder selects a particular service, e.g., taxes or renewing a driver's license, provided by the issuing entity. When the user selects a service, the App 112 provides an indication to the SDK 108 representing the selection. The SDK 108 may then retrieve the provisioned data, which is defined by the set of non-document data elements in the data structure, and execute a workflow.

In addition, these techniques allow a government or country to provision UI templates or information that designate how certain information may be displayed. For example, one government may have a different looking UI than another government. In some examples, the URL may point to a web page whose HTML title and HTML favicon may be used to provision the information for the particular tab title and icon. In some examples, the URL may point to the web page to use as a template. In some examples, the URL may point to a JSON object that contains the information used to customize the UI.

The App 112 may control the UI template and the SDK 108 may be the source for the provisioned or imported item(s) and action(s) to present to the user or holder 104. The user understands the information from the issuing entity, e.g., issuing entity 100A, recognizes the item(s) and may select an action. The SDK 108 may execute a workflow specified by the issuing entity for the selected action.

During the workflow, the SDK 108 may use callbacks to deliver status updates and get support from the App 112 to perform elementary actions.

The issuing entity knows what the content is about, what kind of content it is, and what can be done with it. The App 112 follows what is specified by the issuing entity to present the content and to present application actions.

The SDK API is independent from:

the underlying document type(s), which means the UI template is independent from the underlying document type and automatically inherits from what is supported by the SDK with no change to the UI template.

the workflow to execute, which means the App automatically benefits from what is supported by the SDK with no change to the UI template.

The App 112 may support a set of elementary actions, each applicable to different workflows. Such a solution may ensure that new workflow may be introduced with no change to the App except for compiling a new version.

Figure 2:
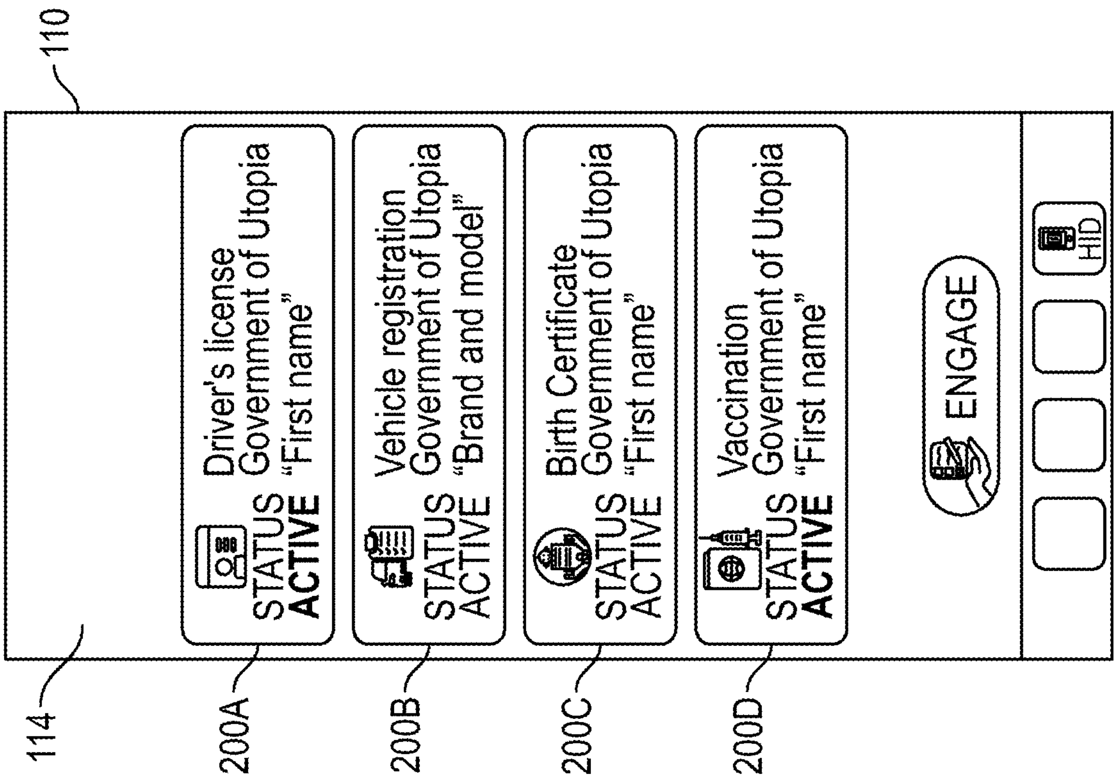
FIG. 2 is an example of a user interface on a mobile device displaying various virtualized credentials to a holder.

FIG. 2 is an example of a user interface on a mobile device displaying various virtualized credentials to a holder. The example shown in FIG. 2 is an example of a digital wallet and illustrates four virtualized credentials 200A-200D that may be selected by a holder using the UI 114 for display on the mobile device 110, including a driver's license 200A, a vehicle registration 200B, a birth certificate 200C, and a vaccination 200D. The information to present such credentials is delivered by the issuer as part of the non-document data and not from the document data. Each of the virtualized credentials 200A-200D of FIG. 2 only show a portion of the available information. In addition, available actions are provided by the non-document data, such as the ability to "engage", as seen in FIG. 2. By selecting a credential, e.g., vaccination 200D, the holder may display additional information on the UI 114, such as one or more vaccination records. The issuer may have provisioned an action to show relevant information about the vaccination records. For these kinds of actions, the UI may present a template to display the data and this template may be populated with information from the document data to avoid duplication. What is provisioned is the template and the App or SDK knows what to inject when presenting the data to the user. That again allows the issuer to control what is shown to the user.

Figure 3:
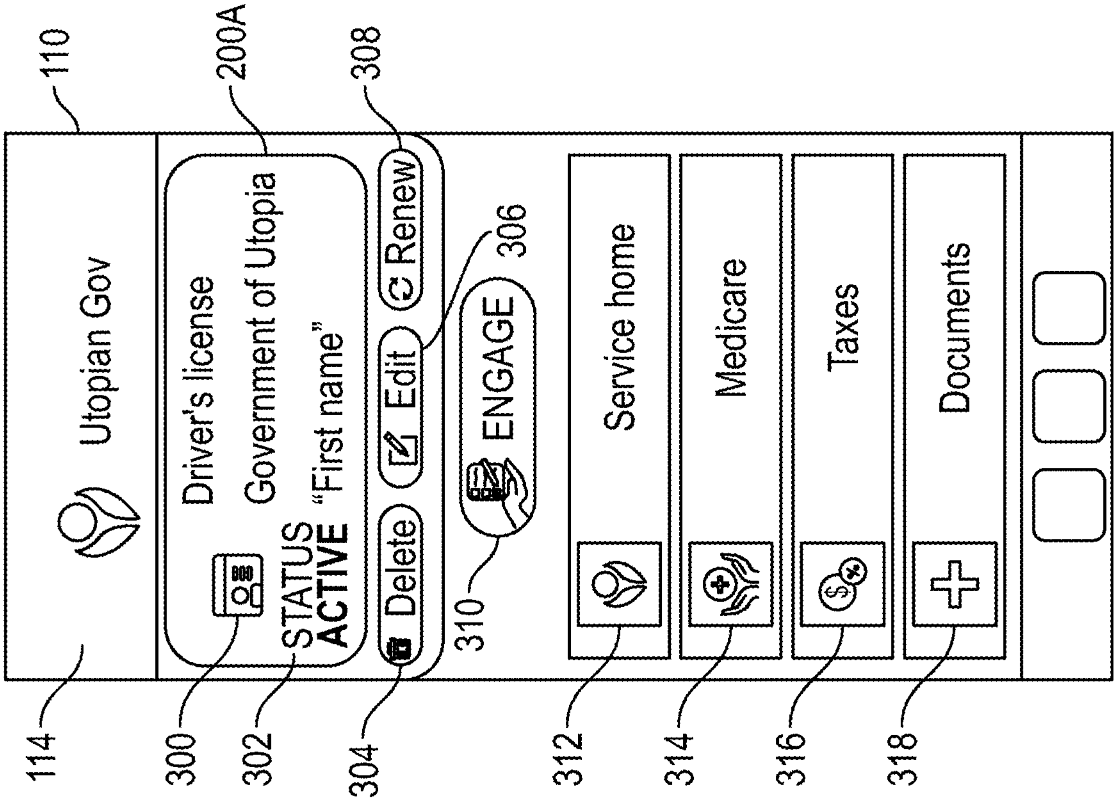
FIG. 3 is another example of a user interface on a mobile device displaying various virtualized credentials to a holder.

FIG. 3 is another example of a user interface on a mobile device displaying various virtualized credentials to a holder. The example shown in FIG. 3 is another example of a digital wallet and illustrates a virtualized credentials 200A, e.g., a driver's license, that may be selected by a holder using the UI 114 for display on the mobile device 110. The information to present such credentials is delivered by the issuer as part of the non-document data and not from the document data. In addition, available actions are provided by the non-document data, such as the ability to "delete", "edit", and "renew", as seen in FIG. 3. By selecting a credential, e.g., a driver's license 200A, the holder may display additional information on the UI 114, such as an image of the holder, an address of the holder, a birthdate of the holder, etc.

In addition, unlike the document-centric example shown in FIG. 2 and using various techniques of this disclosure, the example shown in FIG. 3 may display, on the UI 114, information representing the set of document data elements in a format defined by the non-document data elements, where the information at least partially defines the credential and where the non-document data elements are defined by the issuing entity. For example, the driver's license 200A depicted displays three lines of text, personal information associated with the virtualized credential in the format defined by the non-document data elements, such as a picture or an image 300 of the holder, and a status icon 302 that indicates whether the credential is active, expired, etc. The issuing entity, e.g., a department of motor vehicles, may define, via non-document data elements, the information displayed in each of the three lines of text, how that information is displayed on the UI 114, and a positioning of the image 300 on the UI 114, for example. With these techniques, the data is fully independent from the underlying doctype. In addition, the issuing entity may determine what is available to present in the UI 114. The item displayed on the UI 114 may represent a document that may be shared, e.g., such as a driver's license, or be used by the issuer to present local actions.

In some examples, the UI 114 of the device of the holder may display an icon associated with the virtualized credential in the format defined by the non-document data elements. The holder may select, using the UI 114, the icon and action associated with the document or virtualized credential, such as a delete icon 304, an edit icon 306, or a renew icon 308, which may all be provisioned by the issuing entity. In this disclosure, information that is provisioned by the issuing entity allows the mobile device to: 1) present the item, 2) know if the item is a document or service, and 3) know what workflow is associated with an action (independently from the text provisioned to present the action). This may be important in the case of an App with SDK because the App is still aware about the underlying workflow that will be started and may act accordingly. For example, the App may know that the workflow is about the "delete" action and may ask the user to confirm before sending the call to the SDK.

The delete icon 304, the edit icon 306, and the renew icon 308 may be associated with non-document data elements defined by the issuing entity, such as the department of motor vehicles. In response to a selection, the SDK 108 of FIG. 1 (or the App 112 of FIG. 1) may execute a workflow at least partially defined by the non-document data elements. For example, a selection of the edit icon 306 may execute a workflow that requests a modification to at least one of the document data elements of the virtualized credential, e.g., the driver's license 200A. The edit icon 306 may be an elementary action that applies any form to fill, for example. The provisioned title and purpose may specify what to do with the data.

As another example, a selection of the delete icon 304 may execute a workflow that requests that information associated with the document, e.g., the driver's license 200A, be deleted. In response, SDK 108 of FIG. 1 (or the App 112 of FIG. 1) may execute a workflow that generates and transmits, to the issuing entity, a revocation request where revocation results in deletion of the credential or document.

As another example, a selection of the renew icon 308 may execute a workflow that renews the provisioned data by checking for updates.

Along with the delete, edit, and renew actions, the issuing entity may provision other actions, such as "show", "QR code", "message", "verify", and "web", which may be executable by the App or the SDK. In some examples, these actions may include a call for the SDK to execute a workflow. In other examples, these actions may be a call to the SDK to return an action for the App to execute. It should be noted that some workflows may be called without the need for the issuing entity to provision, e.g., the "engage" icon 310.

The ISO standard for mobile driving license application currently mandates that the Latin alphabet used for the majority of document data elements such as the first name, last name, address, etc. The Latin alphabet requirement includes the principal mandatory fields expected to be present in the document. The Latin alphabet requirement is a limitation for countries that do not use a Latin alphabet because it means the information in the ISO compliant document is not necessarily understandable by the holder of the document. The latest version of the ISO standard allows for a small number of optional non-Latin fields (such as family_name_national_character and given name_national_character) and a domestic namespace where information in a local language may be used. However, this is still a very limited design.

In addition to presenting challenges to the holder 104, not provisioning UI data, such as by the issuing entity, may make the App 112 responsible for deciding how to parse and present the information to the holder. As such, the App 112 must decide which information to select from a document to present in the UI 114, which means the App 112 must also understand the document type (e.g., identifiers of specific data elements). This prevents the App 112 from being truly agnostic to the underlying data structure and less likely to be able to support any document type without changes to this logic.

By using various techniques of this disclosure, the UI information may be provisioned by the issuing entity. For example, the mobile device may display on the user interface information representing the set of document data elements in the format defined by the non-document data elements (defined by the issuing entity), which may include displaying text using an alphabet different from that used by the received set of document data elements, e.g., display Chinese or Arabic instead of a Latin alphabet. Using these techniques, the alphabet is different from the document attributes and all are received within the same document data elements. Provisioning the UI information makes it independent from document type, document alphabet, etc.

In order to make it easier for an issuer and app developer, a JavaScript object notation (JSON) format may be used to store the UI data. The UI data may be stored inside the Concise Binary Object Representation (CBOR) mdoc data structure during the provisioning process and then extracted by the SDK at the time the UI data is provisioned. This technique may enable the use of a standardized JSON query technology to be used to query the data and discover the UI content (using technologies such as JMESpath).

In addition to the ability to provision information for the UI that is separate from the document data, the techniques of this disclosure also provide the ability to provision an action or information just for the UI, such as when there is no document to share. This may include a set of actions to be presented in the App, such as the option to connect to an issuer web site or perform certain functionality, such as a transaction. As an example, the provisioned action may specify that the SDK, for example, execute a workflow. In some examples, the workflow may return an elementary action for the App to execute to support the workflow, such as "show QR code". In some examples, the action may be related to the document data, such as "show", "edit", and "temporarily share", such as for a vehicle registration.

Non-limiting examples of provisioned information for the UI that is separate from the document data are depicted in FIG. 3. For example, the UI 114 may display the "Service home" icon 314. When the holder selects the icon, the SDK, for example, may execute a workflow at least partially defined by the non-document data elements that connects to a website of the issuing entity, such as a homepage. In some examples, the SDK may execute a workflow where the workflow requests one or more actions for the App to execute. In some examples, the SDK may execute a workflow that returns an action for the App to execute.

In some examples, the non-document data elements include information representing a service made available by the issuing entity. The UI 114 may display the information representing the service made available by the issuing entity. For example, the UI 114 may display a "Medicare" icon 316, "Taxes" icon 318, or the like that, when selected, connect to a website, for example. A "Documents" icon 318 may display a document.

In this manner, the issuing entity may provision information for the App to connect to a specific website and for a specific purpose. The action may be presented to the holder in the form of a purpose (e.g. to initiate to a government service) rather than the underlying action itself. For example, this may include a link to access a specific service that may not may not be related to the document the data has been provisioned with. For example, a link to Citizen services, not specific to document.

In addition, an issuing entity may also elect for some of the services (or bookmarks) to be deleted while others, such as service home, remain. This may provide the opportunity for the end user to only keep what is relevant while the issuing entity may ensure that important bookmarks/services cannot be removed.

In addition, the issuing entity may provision information containing data that the App should display as a code, such as a QR code. For example, the data could be a vaccination passport that may be made available for a traditional verification that may involve data from another document or be presented as is.

The issuing entity may also provision information for the document to be presented in the App. The information may already be sufficient to present to the holder (e.g., such as to ensure that the document is correct) but not be suitable for a verification. The information that is provisioned may contain a list of label-value keys for the App to present when such action is selected. This is different from a modification that is interactive and requires user input to proceed.

For the above, in some examples, a local JSON remote procedure call (RPC) request may be used that is provisioned by the issuing entity with a given action so that the App knows what process to apply and what the parameters are. The JSON RPC request format identifies the kind of action required and delivers the necessary data to execute the action. This can occur after a user has selected a specific action or even without user interaction.

The issuing entity may provision command actions, such as deletion of an item from the digital wallet. Such action may also be reported to the issuing. Another command action that the issuing entity may provision is "Delete Credential". This action may allow a citizen to request that their credential is deleted and may initiate the delete credential workflow, such as implemented by the SDK.

The issuing entity may provision collaborative actions. For example, the issuing entity may provision an action that requires user input, such as engaging in a verification. This action may start by engaging with a verifier of a verification service then, once engaged, the process allows receiving of the request and proceeding with consented data. There may be multiple steps where the App may have to receive user input. For such an option, the issuing entity may provision the necessary information to start a particular workflow (e.g., the verification workflow) then the workflow may rely on notification for obtaining user input.

Another collaborative action includes a request to modify document data and receive an update. Although this action is related to document data to modify, the action may remain dissociated from the document itself as the issuing entity may provision only the information that is available for a change request. Once modified, the process associated with the action allows receiving the changes and delivering to the issuing entity.

Another collaborative action includes a request to transfer credential to another device. This action may request that a credential is transferred from one device to another device.

Another collaborative action includes a call for a refresh. For example, the call for refresh may renew only the keys and authenticity signature or may update the credentials as a whole. This may be transparent to the App. In other examples, an option to provision conditional actions may included, e.g., action that will show only when certain conditions are met. For example, the "renew" action may be displayed when either one of the following condition is met: the document instance is about to expire or the SDK has discovered an update is available to provision, etc.

Any of the above actions may be conditional and the issuing entity may specify the conditions for such an action in order to detail how it should be made available for use. The conditions may be delivered along with the UI information. An example of a conditional action may include applying an update—other than revocation—that has been received. For example, this may include replacing a provisioned document with a new one. As another example, only certain actions may be displayed on the UI when certain criteria are met, e.g., when it is time to renew the credential.

In some examples, the SDK, for example, may execute a workflow at least partially defined by the non-document data elements that includes permitting access to at least some of the non-document data elements by a verification service. For example, the issuing entity may communicate with a target App using an individual postbox. The data that is posted to the postbox may be encrypted and may only be opened by the target App. The postbox may be unique for a document in that App and may be used to communicate updates and revocation. Each postbox may have a unique address.

The issuing entity may provision the address of the postbox for that document. Such information may be restricted to an authorized verifier (e.g., subject to verifier authentication). A verifier may request that information like any other data element from the document and, using that information, a verifier may obtain a status about pending content in that postbox. Although the verifier is not able to see the content, the verifier will know that a pending update is present and therefore the document may not be up to date.

In some examples, the non-document data element may include a URL to check for active/revocation status of the document. The URL may be set by the issuing entity and may be the URL of the postbox to check for pending updates or a server, e.g., running OCSP, to get a status.

The issuing entity may provision an object to be delivered as a data element. This may include 1) relevant data for the object to support the applicable workflow(s); 2) information for the category the object belongs to, including icon, name and a set of actions/methods that may be started from that category; 3) as many icons and lines as provisioned by the issuing entity, where the issuing entity may customize the information for a known App; and 4) a set of actions/methods for that object that are each mapped to a workflow that can be executed by the SDK, for example.

As mentioned above, the SDK may execute various workflows. For example, a workflow may return a data element from a specified object to the App, where the data element value may 1) connect to a website, which may apply to use cases to connect to the website of the issuing entity, to start onboarding or provisioning process, etc. (an object with a document may also include a URL); and 2) show a picture, which may apply to use cases such as QR code for vaccination passport, etc.

Another example of a workflow may engage in a verification. This workflow is typically started from an action/method from a category. During a verification process, the SDK may notify the App about the request then receive the list of consented data. In some examples verification may rely on data outside of the SDK and may be delivered as device signed items.

In a non-limiting specific implementation, the App may be embedded with an SDK library that delivers all the workflow. In another example, a zero-code App for web-based UI may be used. Such an App may download the UI template from a specific backend. Then, the code of the downloaded page may call specific functions such as those API from the App with an SDK described above.

FIG. 4 is a flow diagram of an example of a computer-implemented method 400 of providing a virtualized credential of a holder. The method 400 is represented as a set of blocks 402-404 that describe operations of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other components of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At block 402, the method 400 may include receiving, from an issuing entity and on a device of the holder, a set of document data elements and a set of non-document data elements, wherein the document data elements at least partially define the virtualized credential, wherein the document data elements are defined in a set of document data element fields of a data structure, wherein the non-document data elements are defined in a set of non-document data element fields of the data structure, and wherein the non-document data elements are defined by the issuing entity. For example, the mobile device 110 of the holder 104 of FIG. 1 may receive from the first issuing entity 100A of FIG. 1 a set of document data elements and a set of non-document data elements. Regarding non-document data elements, the data structure may contain data elements whose identifiers may be organized in namespaces and, in that structure, some of the identifiers or namespace may be used for non-document data.

At block 404, the method 400 may include displaying, on a user interface of the device of the holder, information representing the set of document data elements in a format defined by the non-document data elements, wherein the information at least partially defines the credential. For example, the UI 114 of mobile device 110 of FIG. 1 may display information representing the set of document data elements in a format defined by the non-document data elements, such as shown in FIG. 3.

In some examples, displaying, on the user interface of the device of the holder, information representing the set of document data elements in the format defined by the non-document data elements may include displaying text using an alphabet different from that used by the received set of document data elements. In other examples, it may include displaying an icon associated with the virtualized credential in the format defined by the non-document data elements. In yet other examples, it may include displaying personal information, such as a picture, of the holder associated with the virtualized credential in the format defined by the non-document data elements.

In some examples, the method 400 may include receiving, from the holder, a selection on the user interface, and executing a workflow, e.g., by the SDK 108 of FIG. 1, at least partially defined by the non-document data elements.

In some examples, executing a workflow at least partially defined by the non-document data elements may include connecting to a website of the issuing entity. In other examples, it may include displaying a code on the user interface. In other examples, it may include requesting a modification to at least one of the document data elements. In other examples, it may include requesting that information associated with the document be deleted and, in some such examples, the method may further include generating and transmitting, to the issuing entity, a revocation request, wherein revocation results in deletion of the document.

In some examples, after requesting a modification, the requested modification may be transmitted to the issuing entity for validating and confirmation, and the mobile device may receive an updated to the document data in response to the issuing entity validating and confirming the requested modification.

In some examples, executing a workflow at least partially defined by the non-document data elements may include permitting access to at least some of the non-document data elements by a verification service.

In some examples, the non-document data elements may include information representing a service made available by the issuing entity and the method may include displaying, on the user interface of the device of the holder, the information representing the service made available by the issuing entity. For example, a link or other information related to services from the issuing entity, e.g., taxes, may be displayed.

FIG. 5 is a flow diagram of an example of a computer-implemented method 500 of providing a virtualized credential of a holder. The method 500 is represented as a blocks 502 that describes operations of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 5. The one or more processors may instruct other components of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At block 502, the method 500 may include transmitting, from an issuing entity to a device of the holder, a set of document data elements and a set of non-document data elements, where the document data elements at least partially define the virtualized credential, where the document data elements are defined in a set of document data element fields of a data structure, where the non-document data elements are defined in a set of non-document data element fields of the data structure, where the non-document data elements are defined by the issuing entity, where the non-document data elements define a format for displaying information representing the set of document data elements on a user interface of the device of the holder, where the information at least partially defines the credential.

In some examples, the method 500 may include receiving, from the device of the holder, a revocation request, where revocation results in deletion of the document.

Figure 6:
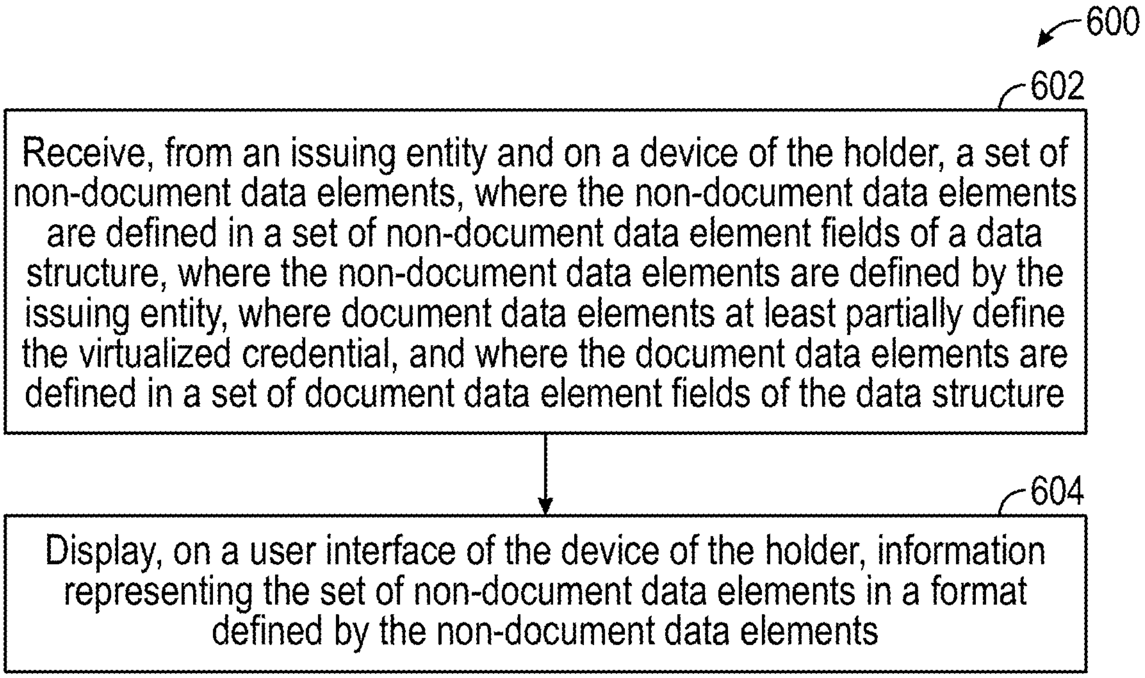
FIG. 6 is a flow diagram of an example of a computer-implemented method 600 of providing a virtualized credential of a holder.

FIG. 6 is a flow diagram of an example of a computer-implemented method 600 of providing a virtualized credential of a holder. The method 600 is represented as a blocks 602-604 that describes operations of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 6. The one or more processors may instruct other components of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At block 602, the method 600 may include receiving, from an issuing entity and on a device of the holder, a set of non-document data elements, where the non-document data elements are defined in a set of non-document data element fields of a data structure, where the non-document data elements are defined by the issuing entity, where document data elements at least partially define the virtualized credential, and where the document data elements are defined in a set of document data element fields of the data structure. Here, unlike in FIG. 4, the device of the holder need not receive a set of document data elements.

At block 604, the method may include displaying, on a user interface of the device of the holder, information representing the set of non-document data elements in a format defined by the non-document data elements. In some examples, displaying, on a user interface of the device of the holder, information representing the set of non-document data elements in a format defined by the non-document data elements may include displaying, on the user interface of the device of the holder, information representing a service made available by the issuing entity.

In some examples, the method 600 may include receiving, from the holder, a selection on the user interface, and executing a workflow at least partially defined by the non-document data elements. In some examples, executing a workflow at least partially defined by the non-document data elements may include connecting to a website of the issuing entity. In some examples, executing a workflow at least partially defined by the non-document data elements may include displaying a code on the user interface.

Figure 7:
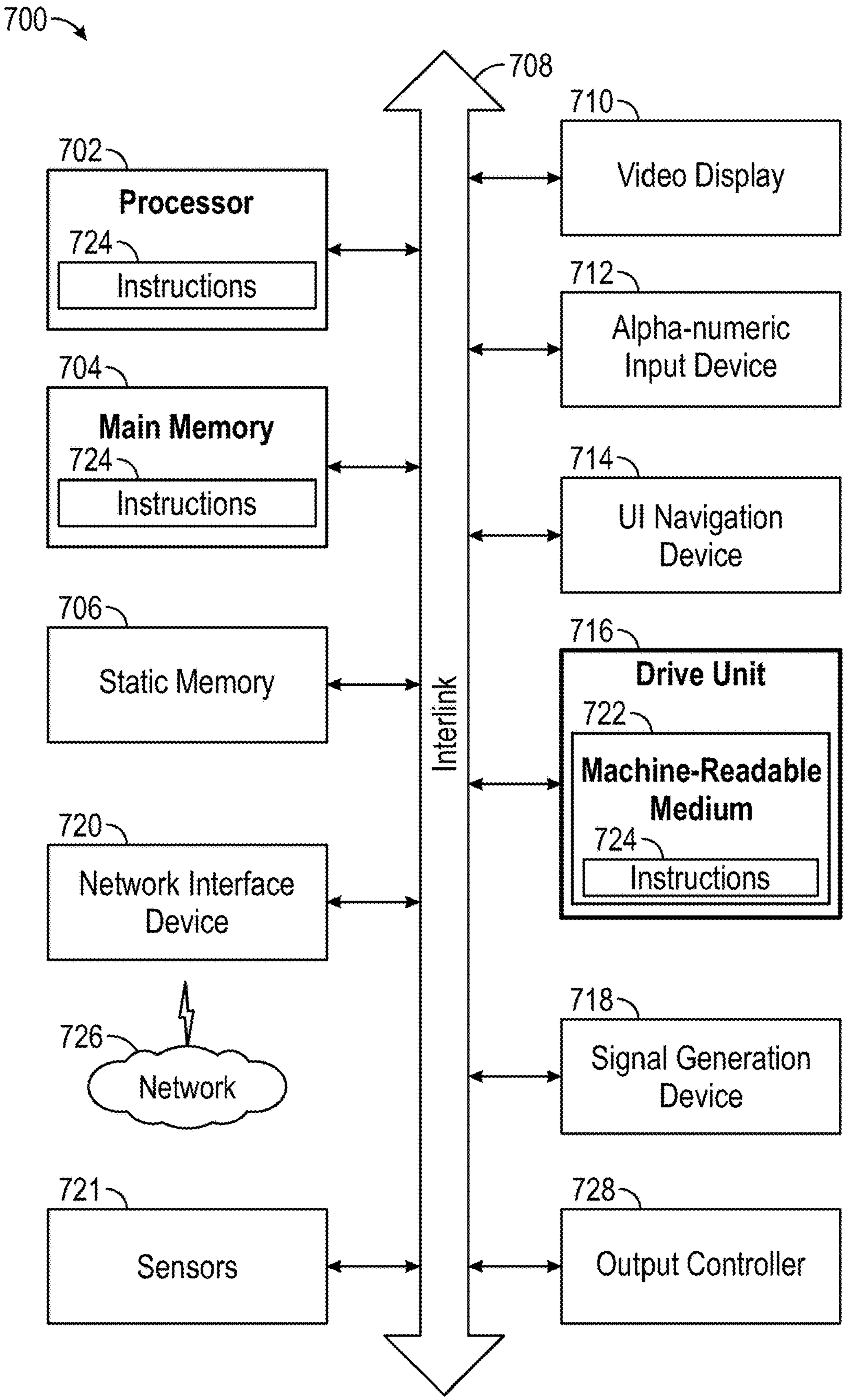
FIG. 7 illustrates a block diagram of an example machine upon which any one or more of the techniques (e.g., methodologies) discussed herein can perform.

FIG. 7 illustrates a block diagram of an example of a machine upon which any one or more of the techniques (e.g., methodologies) discussed herein can perform. In alternative embodiments, the machine 700 can operate as a standalone device or are connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 is a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 700 can perform one or more of the processes described above.

Further, while only a single machine is illustrated, the term “machine” shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms (all referred to hereinafter as “modules”). Modules are tangible entities (e.g., hardware) capable of performing specified operations and is configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software can reside on a non-transitory computer readable storage medium or other machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software can accordingly configure a hardware processor, for example, to constitute a particular module at one instance of time and to constitute a different module at a different instance of time.

Machine (e.g., computer system) 700 can include a hardware processor 702 (e.g., a central processing unit (CPU), a graphics processing unit (GPU), a hardware processor core, or any combination thereof), a main memory 704, and a static memory 706, some or all of which can communicate with each other via an interlink 708 (e.g., bus). The machine 700 can further include a display unit 710, an alphanumeric input device 712 (e.g., a keyboard), and a user interface (UI) navigation device 714 (e.g., a mouse). In an example, the display unit 710, input device 712 and UI navigation device 714 are a touch screen display. The machine 700 can additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 can include a machine readable medium 722 on which is stored one or more sets of data structures or instructions 724 (e.g., software) embodying or utilized by any one or more of the techniques or functions described herein. The instructions 724 can also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 can constitute machine readable media.

While the machine readable medium 722 is illustrated as a single medium, the term "machine readable medium" can include a single medium or multiple media (e.g., a centralized or distributed database, and/or associated caches and servers) configured to store the one or more instructions 724.

The term "machine readable medium" can include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples can include solid-state memories, and optical and magnetic media. Specific examples of machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media can include non-transitory machine readable media. In some examples, machine readable media can include machine readable media that is not a transitory propagating signal.

The instructions 724 can further be transmitted or received over a communications network 726 using a transmission medium via the network interface device 720. The machine 700 can communicate with one or more other machines utilizing any one of a number of transfer protocols (e.g., frame relay, internet protocol (IP), transmission control protocol (TCP), user datagram protocol (UDP), hypertext transfer protocol (HTTP), etc.).

Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. In some examples, the network interface device 720 can wirelessly communicate using Multiple User MIMO techniques.

Examples, as described herein, can include, or can operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client, or server computer system) or one or more hardware processors are configured by firmware or software (e.g., instructions, an application portion, or an application) as a module that operates to perform specified operations. In an example, the software can reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software can accordingly configure a hardware processor, for example, to constitute a particular module at one instance of time and to constitute a different module at a different instance of time.

Various embodiments are implemented fully or partially in software and/or firmware. This software and/or firmware can take the form of instructions contained in or on a non-transitory computer-readable storage medium. Those instructions can then be read and executed by one or more processors to enable performance of the operations described herein. The instructions are in any suitable form, such as but not limited to source code, compiled code, interpreted code, executable code, static code, dynamic code, and the like. Such a computer-readable medium can include any tangible non-transitory medium for storing information in a form readable by one or more computers, such as but not limited to read only memory (ROM); random access memory (RAM); magnetic disk storage media; optical storage media; flash memory; etc.

Figure 8:
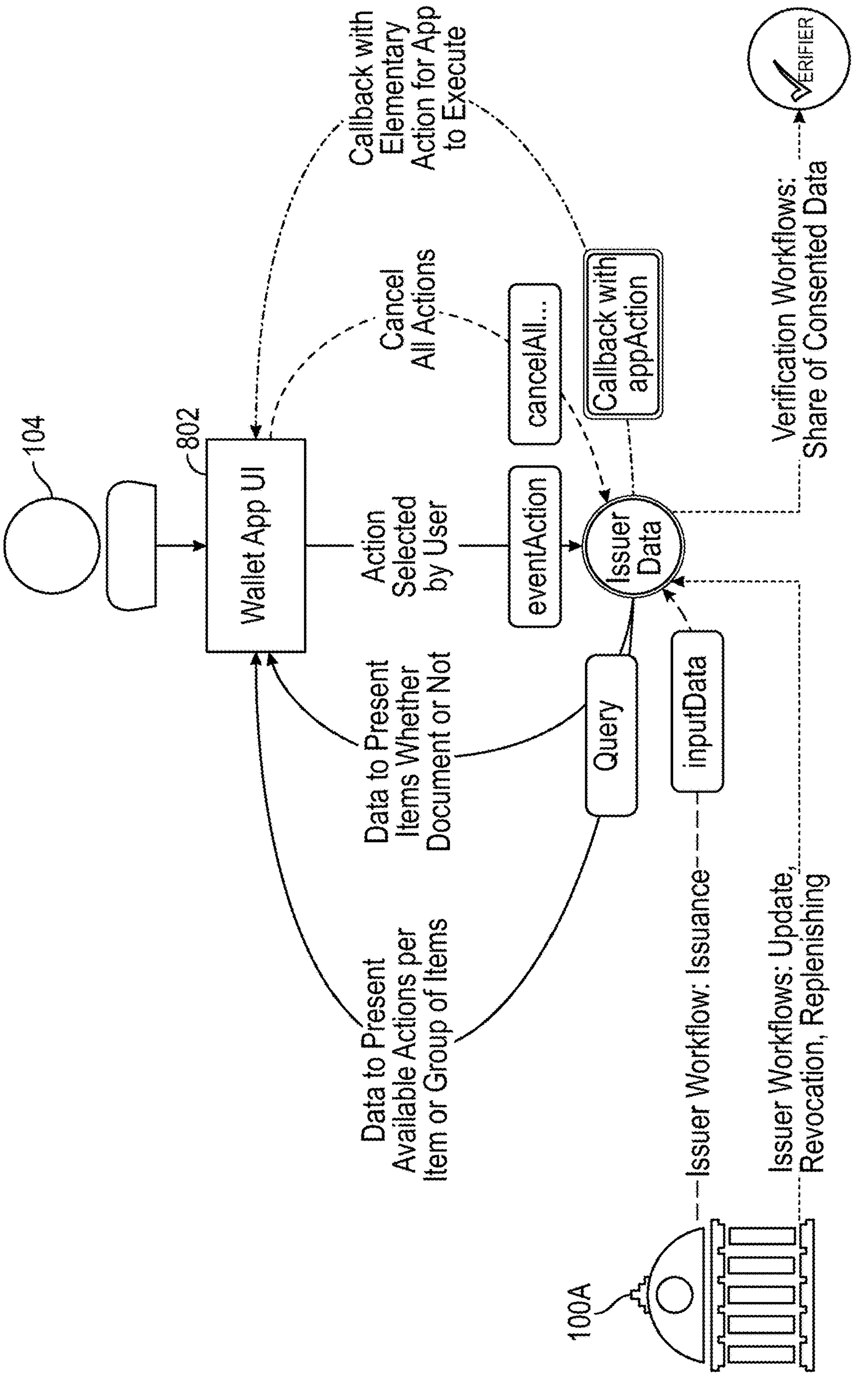
FIG. 8 is another conceptual diagram illustrating a flow of data between an issuer and a user.

FIG. 8 is another conceptual diagram illustrating a flow of data between an issuer and a user. As indicated above, an SDK is not needed. FIG. 8 depicts an example of flow of data between an issuer and user without an SDK. An issuing entity 100A may have various issuer workflows to provide issuer data 800 to the holder 104 via a wallet App 802, without an SDK and in contrast to FIG. 1.

The techniques of this disclosure may deliver more to the issuing entity than just document provisioning and revocation. These techniques may give the power to the issuing entity to:

- Promote and keep in control of the issuer Branding including logo and written expression
- Deliver Issuer information to present the provisioned item in the Application.
  - PII protection according to Issuer polices. No need for the App to access PII from the document
  - Local language whereas ISO only specifies Latin alphabet (domestic is not standard)
  - Independent from the underlying kind of document and document standard
- Deliver Issuer information to present available actions.
  - While an action is bound to a particular workflow, the issuer can set information for the UI to present it.
- Express which items are grouped together
- Express if an action is relevant to a particular item or group of items
- Provision:
  - ISO mobile document of any kinds and more in the future
  - Bookmarks for direct access to the online services
  - Actions to start specific workflow supported by the SDK and which will expand over time.

VARIOUS NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The above description is intended to be illustrative, and not restrictive. For example, the above-described examples (or one or more aspects thereof) can be used in combination with each other. Other embodiments can be used, such as by one of ordinary skill in the art upon reviewing the above description. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment.

The invention claimed is:

1. A method of providing a virtualized credential of a holder, comprising:

receiving, from an issuing entity and on a device of the holder, a set of document data elements and a set of non-document data elements, wherein the document data elements at least partially define the virtualized credential, wherein the document data elements are defined in a set of document data element fields of a data structure, wherein the non-document data elements are defined in a set of non-document data element fields of the data structure, and wherein the non-document data elements are defined by the issuing entity;

displaying, on a user interface of the device of the holder, information representing the set of document data elements in a format defined by the non-document data elements, wherein the information at least partially defines the virtualized credential;

displaying, on the user interface, one or more user interface elements corresponding to a respective one or more actions, the one or more actions enumerated using the non-document data elements;

receiving, from the holder, a selection of a user interface element to activate a respective action, on the user interface; and executing a workflow to implement the action, the workflow at least partially defined by the non-document data elements.

2. The method of claim 1, wherein displaying, on the user interface of the device of the holder, information representing the set of document data elements in the format defined by the non-document data elements includes:

displaying text using an alphabet different from that used by the received set of document data elements.

3. The method of claim 1, wherein displaying, on the user interface of the device of the holder, information representing the set of document data elements in the format defined by the non-document data elements includes:

displaying an icon associated with the virtualized credential in the format defined by the non-document data elements.

4. The method of claim 1, wherein displaying, on the user interface of the device of the holder, information representing the set of document data elements in the format defined by the non-document data elements includes:

displaying personal information of the holder associated with the virtualized credential in the format defined by the non-document data elements.

5. The method of claim 1, wherein executing a workflow at least partially defined by the non-document data elements includes:

executing, by a software development kit, the workflow wherein the workflow requests one or more actions for an application to execute.

6. The method of claim 1, wherein executing a workflow at least partially defined by the non-document data elements includes:

executing, by a software development kit, the workflow, wherein the workflow returns an action for an application to execute.

7. The method of claim 1, wherein executing a workflow at least partially defined by the non-document data elements includes:

displaying a code on the user interface.

8. The method of claim 7, comprising:

transmitting the requested modification to the issuing entity; and receiving an update to the document data in response to the issuing entity validating and confirming the requested modification.

9. The method of claim 1, wherein executing a workflow at least partially defined by the non-document data elements includes:

requesting a modification to at least one of the document data elements.

10. The method of claim 1, comprising:

permitting access to at least some of the non-document data elements by a verification service.

11. The method of claim 1, wherein the non-document data elements include information representing a service made available by the issuing entity, the method comprising:

displaying, on the user interface of the device of the holder, the information representing the service made available by the issuing entity.

12. The method of claim 1, wherein the one or more actions include deleting the virtualized credential, editing the virtualized credential, or renewing the virtualized credential.

13. At least one non-transitory machine-readable medium including instructions for providing a virtualized credential of a holder, that, when executed by a machine, cause the machine to perform operations to:

receive, from an issuing entity and on a device of the holder, a set of document data elements and a set of non-document data elements, wherein the document data elements at least partially define the virtualized credential, wherein the document data elements are defined in a set of document data element fields of a data structure, wherein the non-document data elements are defined in a set of non-document data element fields of the data structure, and wherein the non-document data elements are defined by the issuing entity;

display, on a user interface of the device of the holder, information representing the set of document data elements in a format defined by the non-document data elements, wherein the information at least partially defines the virtualized credential;

display, on the user interface, one or more user interface elements corresponding to a respective one or more actions, the one or more actions enumerated using the non-document data elements;

receive, from the holder, a selection of a user interface element to activate a respective action, on the user interface; and execute a workflow to implement the action, the workflow at least partially defined by the non-document data elements.

14. The at least one non-transitory machine-readable medium of claim 13, wherein the instructions that cause the machine to perform operations to display, on the user interface of the device of the holder, information representing the set of document data elements in the format defined by the non-document data elements comprise instructions to:

display text using an alphabet different from that used by the received set of document data elements.

15. The at least one non-transitory machine-readable medium of claim 13, wherein the instructions that cause the machine to perform operations to display, on the user interface of the device of the holder, information representing the set of document data elements in the format defined by the non-document data elements comprise instructions to:

display an icon associated with the virtualized credential in the format defined by the non-document data elements.

16. The at least one non-transitory machine-readable medium of claim 13, wherein the instructions that cause the machine to perform operations to display, on the user interface of the device of the holder, information representing the set of document data elements in the format defined by the non-document data elements comprise instructions to:

display personal information of the holder associated with the virtualized credential in the format defined by the non-document data elements.

17. The at least one non-transitory machine-readable medium of claim 13, wherein the instructions that cause the machine to perform operations to execute a workflow at least partially defined by the non-document data elements comprise instructions to:

execute, by a software development kit, the workflow wherein the workflow requests one or more actions for an application to execute.

18. The at least one non-transitory machine-readable medium of claim 13, wherein the instructions that cause the machine to perform operations to execute a workflow at least partially defined by the non-document data elements comprise instructions to:

execute, by a software development kit, the workflow, wherein the workflow returns an action for an application to execute.

19. The at least one non-transitory machine-readable medium of claim 13, wherein the instructions that cause the machine to perform operations to execute a workflow at least partially defined by the non-document data elements comprise instructions to:

display a code on the user interface.

20. The at least one non-transitory machine-readable medium of claim 19, comprising instructions that cause the machine to perform operations to:

transmit the requested modification to the issuing entity; and receive an update to the document data in response to the issuing entity validating and confirming the requested modification.

21. The at least one non-transitory machine-readable medium of claim 13, wherein the instructions that cause the machine to perform operations to execute a workflow at least partially defined by the non-document data elements comprise instructions to:

request a modification to at least one of the document data elements.

22. The at least one non-transitory machine-readable medium of claim 13, comprising instructions that cause the machine to perform operations to:

permit access to at least some of the non-document data elements by a verification service.

23. The at least one non-transitory machine-readable medium of claim 13, wherein the non-document data elements include information representing a service made available by the issuing entity, including instructions, that, when executed by a machine, cause the machine to perform operations to:

display, on the user interface of the device of the holder, the information representing the service made available by the issuing entity.

24. The at least one non-transitory machine-readable medium of claim 13, wherein the one or more actions include deleting the virtualized credential, editing the virtualized credential, or renewing the virtualized credential.

* * * * *